3,203,851
METHOD OF PRODUCING HIGHLY FILLED COMPRESSED MASSES OF FIBER-LIKE FILLER MATERIAL AND THERMOPLASTIC SYNTHETIC MATERIAL AND COMPRESSED BODIES MADE OF SUCH COMPRESSED MASSES, PARTICULARLY PLATES AND LAMINATIONS
Karl-Ludwig Blau, Ettlingen, Baden, and Alfons Herr, Karlsruhe, Germany, Josef Lintner, La Garenne-Colombes, France, and Otto Wilhelm, Karlsruhe, Germany, assignors to Vinypal S.A., a corporation of Luxembourg
No Drawing. Filed June 18, 1959, Ser. No. 821,094
Claims priority, application Germany, June 18, 1958, L 30,610
8 Claims. (Cl. 162—168)

The present invention relates to highly filled compressed masses of fiber-like filling material and thermoplastic synthetic material and compressed bodies made of such compressed masses, particularly plates and laminations, and a method of producing the compressed masses.

It is known to produce compressed bodies and plates of wood fibers, asbestos or similar, preferably fiber-like materials capable of suction by use of thermoplastic artificial resins as a binder.

In this case, a process is applied, for instance, according to which the finely ground material and such material reduced to fibers, respectively, is mixed with a watery dispersion of the artificial resin and then the product thus obtained is solidified by feeding of heat, for instance, in drying channels, or by subjecting the product to heat and pressure in hydraulic presses.

This known method has first of all the drawbacks that the received form bodies are somewhat sensitive to water, the material is non-homogenous and inclines to warpings.

It has been also attempted to mix the fiber-like material which has suction characteristics, for instance wood flour, with finely pulverized, hydrophobe, thermoplastic artificial resins, for instance polyvinylchloride by application of heat and then to subject this mass to pressure.

Due to the humidity which is present in the wood flour, the hydrophobe, artificial material hardens, however, incompletely only with the filling material, and due to its low capacity of flowing, it does not penetrate by this method to the inside of the filling material, so that first of all in a highly filled material the firmness, homogeneity and the trueness as to form of such compressed bodies do not satisfy completely.

It has been also proposed to subject at first the filling material which has suction characteristics to a preliminary preparation, in order to reduce its capacity to receive water, for instance by impregnation with mineral oils, with drying oils, with aldehyde resins, etc., and to mix this pre-prepared filling material with the artificial resin or its watery dispersions. Such pre-treatment is expensive. By the use of cellulose-containing filling material the elasticity of the material is reduced to an undesirable degree and it counter-acts the desire to produce a most homogeneous material.

It is, therefore, one object of the present invention to provide a method of manufacturing highly filled, compressed masses as well as homogenous and water-resistant compressed bodies made of such compressed masses, particularly plates and laminations, which compressed bodies comprise compressible and fiber-like filling material having a suction characteristic and a thermoplastic water-repellent artificial resin.

It is another object of the present invention to provide a method of manufacturing highly filled compressed masses, wherein the thermoplastic component of the artificial resin is equally divided and adheres to the fibers of the filling material in form of smallest particles and wherein in the compressed body formed from said mass, for instance in the plate, in the lamination, etc., the thermoplastic, water-repellent artificial resins forms with the compressible and fiber-like material, which has a suction characteristic, a homogeneous and practically pore-free mass, in which the fiber structure of the filling material is still retainind.

As suitable compressible fiber-like material which is suitable for suction are, among others, to be named: wood flour, ground wood, wood fibers, cellulose material, short cut textile fibers of vegetable and animal origin, leather waste reduced to fine fibers, or similar hydrophil and compressible mineral products, as for instance asbestos flour or asbestos fibers. The filling material is finely ground or disintegrated to such an extent, that a sufficient impregnation of the particles or fibers may be brought about. During the disintegration and the grinding, respectively, it is to be observed that the particles of the filling material receive a "fiber form."

All water repellent, thermoplastic synthetic resins may be used as water repellent thermoplastic component of the synthetic resin, as long as they may be brought to flow under certain pressure at a certain temperature range, which temperature is lower than the temperature at which the filling material decomposes. It is not necessary that these synthetic resins are put into a solution, it is rather sufficient if they are present in finest powder form and if they may be brought to a swelling by means of solvents and softeners.

By using of finely decomposed wood fibers or of cellulose fibers, as used in the paper industry and in the cardboard industry, and of polyvinyl-chloride which has softening capacities as a component of the artificial resin, the compressed bodies, for instance plates or cardboards or laminations, have the characteristics of a fiber-containing, thermoplastic synthetic material with a content of 40–60% of artificial resin. If pure, bleached cellulose fibers are used, the compressed bodies and laminations are glass clear, that means the fiber filling is no more visible. For the purpose of the present invention the mentioned plates or cardboards or laminations are generically called "layers."

The compressed bodies show, however, due to their fiber filling, the "cold flow," found disturbing in thermoplastic artificial material. They do not lend themselves, furthermore, in contrast to true thermoplastic material, to elastic formation.

Layers of 70–80% wood flour or better ground wood and 30–20% polyvinylchloride with a softener content of about 10%, related to said polyvinylchloride, have, however, the characteristics of a dense precious wood. They have a surprisingly great surface hardness. Due to the homogeneity and lack of pores, their water resistance is prominent in spite of their high content of filling material. No warpings occur due to the influence of air humidity. The bodies have a resilient, steel-like elasticity, they can be sawed, planed and polished. If they are subjected to a sawing process, clean cutting faces are obtained. The plates can be nailed, glued, hot welded and also formed after heating. The present material may be considered as a final step of a development with the aim to produce a homogeneous, water resistant and form-stabile working material from the non-homogeneous raw material of wood, which working material may be formed and welded, however, in contrast to wood, as a thermoplastic artificial material if subjected to heat.

It is possible to weld thereto, by application of heat, other compressed parts, for instance other plates or laminations called here "layers" of the same material or of such thermoplastic artificial material which lends itself to welding with the thermoplastic artificial resin of the material, for instance polyvinylchloride laminations or polyvinylchloride plates, called here again "polyvinylchloride layers". This welding may take place during the step of manufacture of the layers, or the welding may be performed in a separate working step.

Since the compressed bodies present an intimate and homogeneous combination of a hydrophobic thermoplastic artificial resin with a hydrophile filling material capable of suction, impregnated lengths of paper and textile material may be condensed directly, for the first time, onto a thermoplastic material with resins hardening by heat, for example with melamine resins or urea resins. The hydrophile amide-resin which is in the non-condensed state combines with the hydrophile filling material of the compressed mass. In this manner, compressed bodies and plates or generally "layers" are obtained for the first time which combine the unusually high surface hardness and resistance of the layers on the amide-resin base with the elasticity and the easy manifold exploitation possiblity of the present thermoplastic plate base.

This material may be also homogeneously colored in the mass, either by coloring the filling material prior to its impregnation with a thermoplastic artificial resin directly, or by admixing thereto suitable color pigments.

It is possible, as is known, to make cellulose difficultly inflammable by additions. It is, therefore, possible to make the present compressed bodies or plates difficultly inflammable or non-inflammable by use of cellulose containing filling material, as wood, by providing such additions. They can be also protected by addition of suitable products against attack by insects and attack by fungi.

The very different and valuable characteristics and the possibilities of variation present in this material, as they could not be combined before in this form in connection with any known material, a rather great number of applications results, not only as compressed mass, but also in form of a compressed raw material as laminations, covering plates, floor plates, table plates, decoration plates, construction parts for furniture, and others.

Preferably the following method is used in preparing this material:

The humid, compressible and properly reduced and decomposed filling material, respectively, capable of suction, for instance wood flour, ground wood, wood or asbestos fibers, are at first impregnated with a solvent for the hydrophobic, thermoplastic artificial resin. If the thermoplastic artificial resin comprises a solid resin component and a liquid, softening component, the latter is applied at first to the filling material, whereby the concentration is, if necessary, reduced with a suitable solvent for simplification of its equal distribution in the material, which solvent, however, in this case, is not necessarily a solvent for the solid component of the artificial resin.

Then the thermoplastic artificial resin, which should be present in fine powdered form, is admixed in which step any application of pressure should be avoided, since such pressure leads to formation of lumps and to a non-homogeneity of the material.

In material consisting of long fibers, it is advantageous to perform the mixing process in a watery dispersion, in order to avoid the clogging together of the fibers and the formation of lumps.

After the complete homogenization of the synthetic resin in the fiber mass, the thermoplastic artificial resin is precipitated and a fiber fleece is produced from the fiber mass then by using devices, similar to those used in the paper, cardboard or wood plate industry, depending upon the used fiber quality, which fiber fleece is freed from water as much as possible by subjecting the same to pressure.

Water which may still be present and a quick-drying solvent which also may be present, is then removed by heating. If a softener is also present the latter is gelated together with the artificial resin. The drying temperatures should be chosen only to such a degree that no melting of the artificial material takes place during the drying process, since this would interfere with the drying process. Depending upon the manufacturing process, a powder product or also a paper-like, a cardboard-like, or a damplate-like material on the fibers of which the thermoplastic artificial resin adheres in form of smallest grains, the dimensions of which are of the order of a few microns, is obtained. A compression of the material during the drying process is to be avoided.

A dry, either powder and fiber material, respectively, or the dry fiber fleece, which has been obtained in a dry or a wet process, for instance the paper-like, cardboard-like or dam-plate-like material, are then subjected to a very high pressure at a temperature range which is above the flowing temperature of the thermoplastic artificial resin, so that a completely homogeneous product is obtained. Under the influence of the pressure, a continuous resin layer is formed on the fibers of the filling material and the thermoplastic artificial resin penetrates into the hollow spaces of the water-free filling material, in such a manner that it welds with the latter to a completely homogeneous, and, under certain circumstances, completely transparent material. The pressure required therefor depends upon the flowing capacity of the artificial resin. The pressure is, for instance, in the conventional polyvinylchloride qualities with a K-value of about 60 at a temperature of about 160° C., depending upon the filling material content, between 60 and 120 kg./cm.$^2$. The application of very high pressures is to be avoided, since the structure of the fiber fleece is, thereby, destroyed, leading to a reduction of the mechanical qualities of the compressed body.

The hot pressure process may be performed on a calender, on a compression press, muti-storied press and sometimes also on any other suitable press. In the manufacture of plate material, it is advantageous to cool the same under pressure to temperatures below 100° C. The compression and the cooling steps may be performed in two different presses.

The above-described method permits the manufacture of a number of articles, which could not yet be produced in the desired form in accordance with the known processes based on an economic and compressible filling material capable of suction, as for instance wood, cellulose, leather waste or asbestos and of a thermoplastic, hydrophobic synthetic resin, as for instance polyvinylchloride, polystyrol, etc. The resulting compressed body equals much more a uniform synthetic material, in spite of its high degree of filling due to its homogeneity and lack of pores and due to its other characteristics, than an agglomerated material, for instance an agglomerated wood in the ordinary sense.

The fiber-like structure of the filling material and the entangled condition of these fibers in the compressed body lend the compressed material considerably valuable mechanical characteristics. It has, in addition, due to its intimate combination, which may be achieved in accordance with the present process between the thermoplastic artificial material and the fibers of the filling material, also an excellent water resistance. It is interesting for the technique of working, that fleece and finished plates and lamination, respectively, may always be newly formed after subjecting to heating.

The praise-worthiness of the articles produced in accordance with the present method, particularly of the plates, is not only caused by its high content of cheap filling material, but also due to the possibility to apply simple press techniques and manufacturing processes, which could not be applied in this manner for the manufacture of plates and compressed bodies.

The operation, in accordance with the present method, will now be more specifically explained in connection

Example 1

240 parts of air-dry, finely ground wood are impregnated with a mixture of 9 parts of tricresyl-phosphate, 1 part of stearic acid and 24 parts of alcohol in a mixer. Then, 80 parts of a possibly fine pulverized polyvinylchloride and 3 parts of lead-stearate are admixed and upon achieving complete homogeneousness the mass is heated to about 140 to 150° C., for instance in a closed, outwardly heated shovel dryer, whereby the alcohol and water contained in the wood fiber is distilled away. The thus obtained dry fiber powder is then formed to a fleece and this fleece is finally compressed in a multi-storied press at a pressure of about 70 to 80 kg./cm.² to a plate. During the pressure process the temperature is increased to about 160 to 170° C. and the material is then subjected to cooling, while the pressure is maintained, to temperatures below 100° C. By this procedure a completely homogeneous, elastic plate capable of being polished is obtained. By covering the fleece with polished and engraved metal sheets, it is possible to obtain in known manner directly during the pressure process surface effects. A lamination of artificial resin is interposed between the pressure metal sheet and the fleece, for instance a polyvinylchloride lamination, or one or a plurality of paper or textile lengths with non-hardened resins which may be hardened by application of heat and are impregnated, and the same are compressed as described above with the fleece, they weld together with the material of the fleece.

Example 2

240 parts air-dry, fine wood flour are thoroughly admixed with 70 parts of finest pulverized polystyrol. Then 30 parts of tetrachlorethylene are sparkled up in an operating mixer and upon thorough homogenization the pulverized mass is heated, as disclosed in Example 1, to about 140 to 150° C. The press temperatures are here about 10 to 30° C. lower, depending upon the softening point of the used polystyrol, compared with a temperature range applied in the use of polyvinylchloride. An unusually hard material is obtained, which, however, is less elastic than that produced with polyvinylchloride.

Example 3

10 parts of air-dry, finely ground wood are applied to and 220 parts of water. 0.3 part of stearic acid is then dissolved in a solution of 0.05 part caustic soda (NaOH) in about 30 parts of water at a temperature of about 40 to 50° C. and in this solution a mixture of 1 part of tricresylphosphate and 0.3 part of perchlorethylene is emulged. The thus obtained emulsion is added to the mudded ground wood and well homogenized with the same. Then a previously prepared mixture of 9 parts of finely pulverized polyvinylchloride with 0.25 part lead stearate is stirred into this mixture and upon achieving homogenization during 20 parts of aluminum sulfate solution, which contains 10 grams of $Al_2(SO_4)_3 \cdot 18H_2O$ per liter, the mass is precipitated with continuous stirring.

The fiber mass is then sucked up in conventional manner on sieves and the water is removed by being squeezed off between rollers as well as possible, and the thus obtained fiber fleece is dried at temperatures up to 120° C. The squeezing of the fiber fleece is to be controlled in such a manner that the dry fleece has a density of about 0.35 to 0.50.

The dry fiber fleece may now be pressed to plates either in a multistoried press, or if profiles, tubes, etc, are to be produced, it is at first reduced to a granulate-like product which is then fed to a suitable press. The compressed material has a density of about 1.2 and is a completely homogeneous mass of wood fibers and polyvinylchloride.

Example 4

In a latex of about 50% solid content, as it is obtained in the emulsion polymerization of vinylchloride, 100 parts of polyvinylchloride, 2.5 parts of lead stearate and 2.5 parts stearic acid are emulged at a temperature of 70 to 75° C. The polyvinylchloride should have a K-value of about 55 to 60 and its particles should be of an order smaller than 10 microns.

In a conventional, already finely ground paper mass of pure bleached cellulose material with a solid content of about 2%, 1000 parts of cellulose material, 100 parts of dioctyl-phthalate, in which has been dissolved previously 3 parts of a water soluble condensation product of ricinoleic acid and ethylene oxide, is emulged with the assistance of a propeller stirring device. Then the paper mass is neutralized and 1000 parts of cellulose material and 3.5 parts caustic soda is added in form of a diluted solution. Then 1800 parts of the above-described latex of the mass are added and thoroughly homogenized by using the propeller stirring device with the paper mass. Upon achieving homogenization, the pH of the mixture is brought to 5.5–6.0 by admixture of a diluted aluminum sulfate solution, and finally the cellulose content of the mixture is adjusted to about 0.1–0.2% by adding of water.

This fiber mass may be worked on a paper machine in conventional manner and without the slightest difficulties to a "paper length." The thus obtained paper is distinguished merely as to its appearance from a conventional paper. Upon subjecting this "paper" to pressure at about 160° C. and 80 kg./cm.², for instance in a press or on a calender, a glass-clear lamination of synthetic material is obtained, which is elastically formable due to its fiber filling in comparison to a conventional polyvinylchloride lamination.

If in this manner pigment colors are worked in, colored polyvinylchloride laminations are obtained which, as to the outer appearance, cannot be distinguished from the conventional laminations.

If now several of these paper lengths are arranged in superposed position prior to subjecting the same to pressure, they weld together during the pressure or calender process to a completely homogeneous transparent material showing no pigment colors. Such "polyvinylchloride papers" may be used after being subjected to pressure either as transparent laminations, or, if they contain pigment colors, in their printed or unprinted state for the manufacture of washable wall-papers, or documents which are foolproof against forgery or in the surface improvement similar to papers soaked with melamine resins.

Example 5

100 parts of leather waste reduced to fibers are put into about 7000 parts of water. 0.35 part of caustic soda in form of a diluted solution is then added to the neutralized mass.

Then 20 parts dioctyl-phthalate are emulged in the mass by means of an effective stirring device with the addition of 1 part of oleate of sodium into the mass. Then 160 parts of the polyvinylchloride latex mixture described in Example 4 is stirred into the mass and upon thorough homogenization, finally the pH of the mixture is adjusted to about 5.5–6.0 by addition of an aluminum sulfate solution. Then the mixture is diluted with the double or treble volume of water and a fleece is produced in usual manner by sucking off on a sieve. The fleece is then dried and subjected to pressure at about 150° C. at a pressure of about 80 kg./cm.². An artificial leather of outstanding resistance to water and oil is thus achieved.

While we have disclosed several embodiments of the present invention, it is to be understood that these embodiments are given by example only and not in a limiting sense, the scope of the present invention being determined by the objects and the claims.

We claim:
1. A method of producing compressed bodies of polyvinylchloride reinforced with fibers, by
   admixing an alkaline adjusted paste of said fibers with an aqueous dispersion of polyvinylchloride;
   precipitating said polyvinylchloride from said dispersion onto said fibers by adding an acid-forming salt and thereby acidifying said mixture causing said polyvinylchloride to adhere to said fibers;
   said mixture being formed by dispersing a finely powdered polyvinylchloride together with a high molecular weight organic acid emulsifier in an alkaline adjusted fiber paste with agitation, and
   adding to said mixture an aqueous emulsion of a plasticizer in an amount sufficient to cause swelling of the surface of said polyvinylchloride particles;
   filtering water from said mixture and forming a mass of dry fibrous material loaded with said polyvinylchloride; and
   then pressing said fibrous material under pressure at an elevated temperature.

2. The method, as set forth in claim 1, wherein said plasticizer is admixed with a minor portion of a volatile solvent.

3. A method of producing compressed bodies of polyvinylchloride reinforced with a fibrous material, by
   admixing and forming a dispersion of finely powdered polyvinylchloride particles in an alkaline aqueous emulsion of (1) said fibrous material and (2) a long chain fatty acid emulsifier, and (3) a plasticizer and a volatile solvent in an amount sufficient to cause swelling of the surface of said polyvinylchloride particles;
   precipitating said polyvinylchloride particles on said fibrous material by acidifying said emulsion with aluminum sulfate;
   filtering water from said emulsion and forming a mass of dry fibrous material loaded with said polyvinylchloride; and
   then pressing said fibrous material under pressure at elevated temperatures to form a solid water repellant body.

4. The method, as set for in claim 3, wherein said acid emulsifier is stearic acid.

5. The method, as set forth in claim 3, wherein said alkaline aqueous emulsion is emulsified by an alkaline salt of a long chain fatty acid.

6. The method, as set forth in claim 4, wherein said plasticizer is selected from the group consisting of tricresylphosphate, dioctylphthalate, and dioctyladipate.

7. The method, as set forth in claim 6, wherein said volatile solvent is selected from the group consisting of alcohol, trichloroethylene, and perchloroethylene.

8. The process, as set forth in claim 7 wherein a polyvinylchloride stabilizer is incorporated into said compressed body by admixing said stabilizer in said emulsion.

References Cited by the Examiner

UNITED STATES PATENTS

| | | | |
|---|---|---|---|
| 1,836,021 | 12/31 | Gibbons | 162—168 |
| 1,919,697 | 7/33 | Groff | 162—168 |
| 2,373,033 | 4/45 | Kopplin | 154—46 |
| 2,530,441 | 11/50 | Reinhardt. | |
| 2,569,169 | 9/51 | Heritage | 156—34 |
| 2,596,364 | 5/52 | Brennan | 156—34 |
| 2,635,045 | 4/53 | Bixler et al. | 162—164 |
| 2,720,476 | 10/55 | Baymiller | 154—49 |
| 2,817,617 | 12/57 | Rogers | 154—100 |
| 2,875,115 | 2/59 | Lott et al. | 154—46 |

FOREIGN PATENTS 591,403   8/47   Great Britain.

EARL M. BERGERT, *Primary Examiner.*

CARL F. KRAFFT, *Examiner.*